W. A. RUSH.
BEET DIGGING MACHINE.
APPLICATION FILED APR. 26, 1917.
1,258,819.
Patented Mar. 12, 1918.
2 SHEETS—SHEET 2.
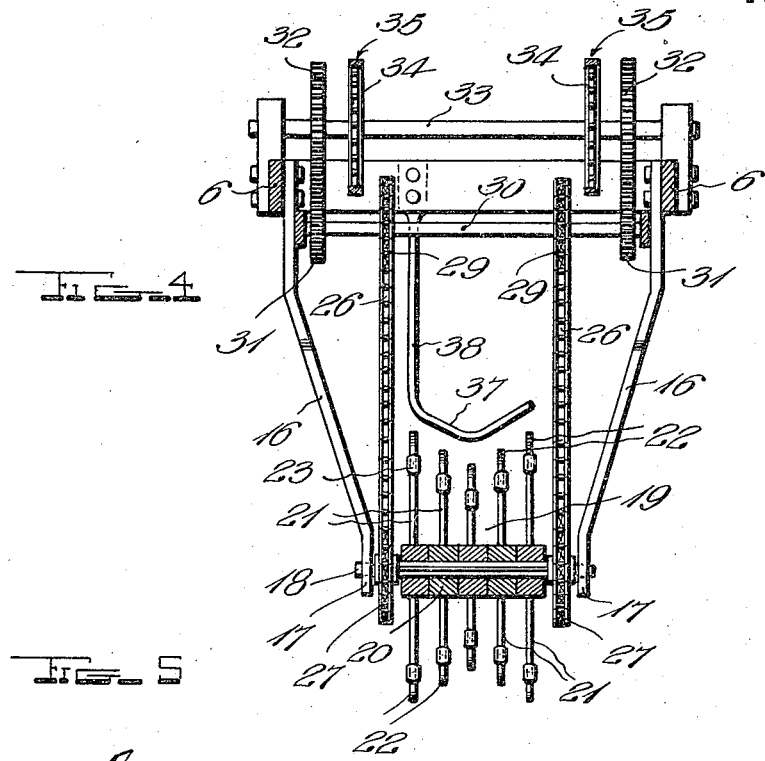
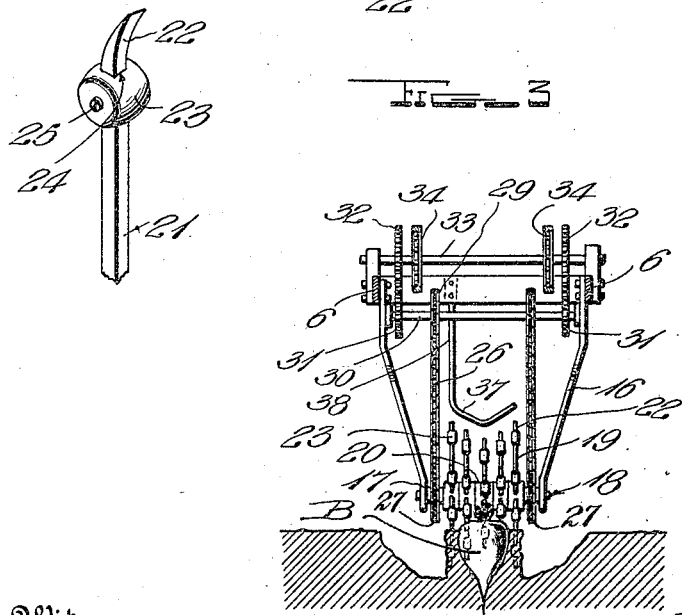
Witness
Inventor
W. A. Rush
By H. R. Willson & Co.
Attorneys

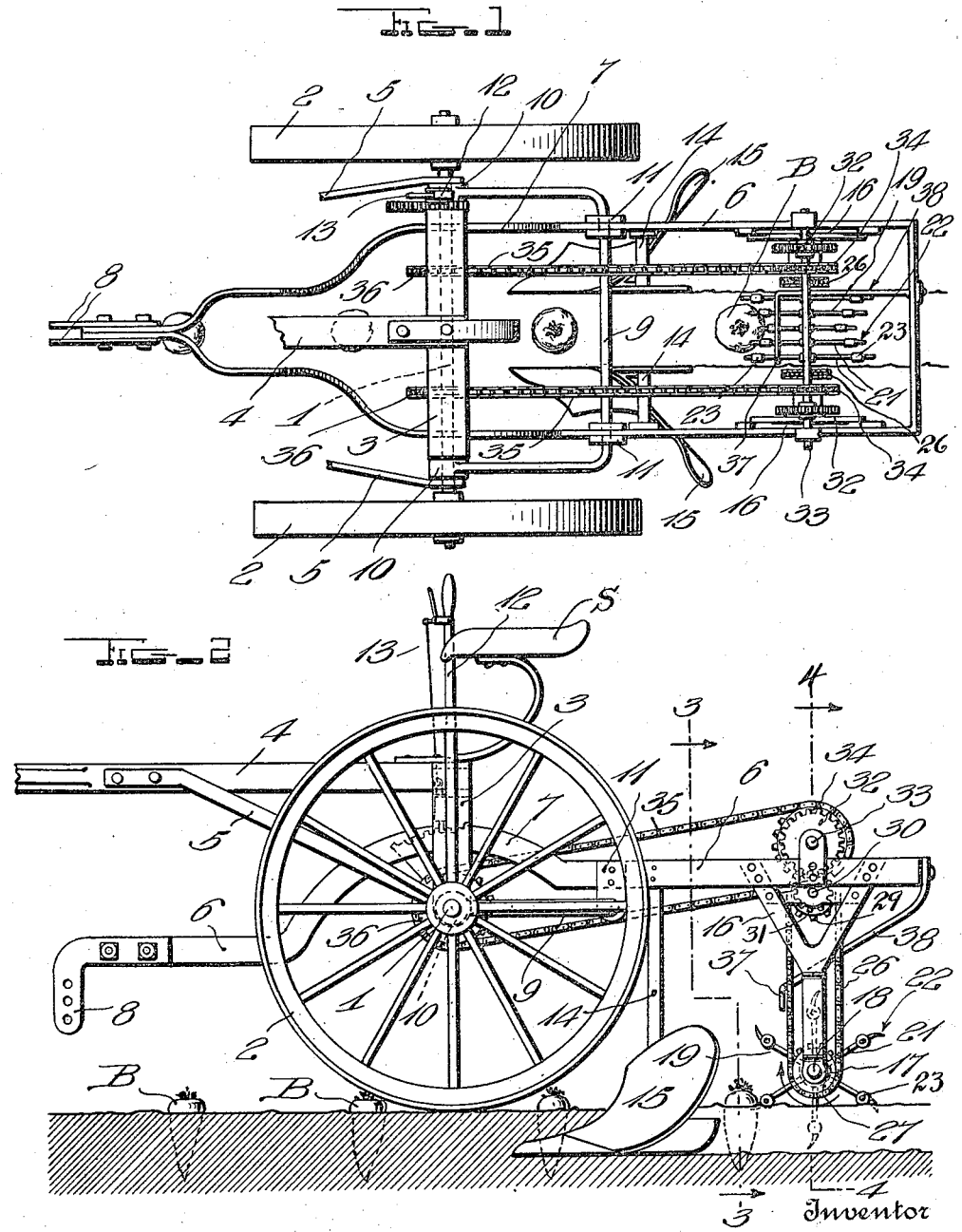

UNITED STATES PATENT OFFICE.

WEAVER ALDUS RUSH, OF LOGAN, UTAH.

BEET-DIGGING MACHINE.

1,258,819.  Specification of Letters Patent.  Patented Mar. 12, 1918.

Application filed April 26, 1917. Serial No. 164,714.

*To all whom it may concern:*

Be it known that I, WEAVER A. RUSH, a citizen of the United States, residing at Logan, in the county Cache and State of Utah, have invented certain new and useful Improvements in Beet-Digging Machines; and I do declare the following to be a full, clear, and exact description of the invention, such as will enable others skilled in the art to which it appertains to make and use the same.

My invention has for its object to provide a novel machine for digging beets in an efficient manner, said means consisting briefly of a pair of plows to remove the earth from opposite sides of the rows of beets to leave said beets standing in a narrow wall of earth, and a rotary pulling member mounted on an axis extending transversely of the machine and having prongs to penetrate the beets and lift them from the earth, each prong having at its inner end a shoulder to limit the amount of penetration.

In the accompanying drawings which constitute a part of this specification;

Figure 1 is a top plan view of the improved machine;

Fig. 2 is a side elevation thereof;

Fig. 3 is a vertical transverse section on the plane of the line 3—3 of Fig. 2 showing more particularly the manner in which the plows leave the beets standing in a narrow wall of earth;

Fig. 4 is another transverse section on the plane of the line 4—4 of Fig. 2, illustrating the manner in which the prongs of the rotary pulling member are set for proper engagement with the beets; and Fig. 5 is a perspective view of one of the radiating arms of the pulling member and the stop and prong thereof.

In the drawings above briefly described the numeral 1 has reference to an axle supported and driven by wheels 2, said axle being rotatably mounted in the ends of an arched frame 3, from which a tongue 4 extends forwardly, said tongue being braced to the ends of the frame as shown at 5.

A tool carrying frame 6 extends between the axle 1 and the crown of the arched frame 3, and is arched at 7 to permit it to lower the required amount before coming in contact with said axle, the front end of said frame 6 being provided with any preferred means 8 for the attachment of a double-tree or the like by means of which the horses or other draft animals are hitched to the machine. A U-shaped shaft 9 is provided at its ends with bearings 10 mounted rockably on the axle 1, the body portion of said shaft being passed through bearings 11 which depend from the side bars of the frame 6. One of the bearings 10 is provided with an upstanding lever 12 by means of which the entire shaft 9 may be swung around the axle 1 to raise or lower the frame 6 as occasion may demand. A suitable pawl and rack mechanism 13 is provided for locking the lever 12 in adjusted position.

A pair of plow standards 14 are secured to the sides of the frame 6 at their upper ends, the lower ends of said standards being equipped with plows 15 so shaped as to remove the earth from opposite sides of the rows of beets and to throw this earth outwardly, thus leaving the beets B standing in a narrow wall of earth. Before the digging operation, the beets are preferably topped in any preferred manner although this is not essential.

Rigid hangers 16 depend from the sides of the frame 6 in rear of the plow standards 14 and at their lower ends carry bearings 17 in which a transverse horizontal shaft 18 is mounted, it being upon said shaft 18 that the beet pulling member 19 is carried, said member comprising a sectional hub 20 keyed on the shaft 18, arms 21 radiating from the sections of said hub, prongs 22 at the outer ends of said arms, and stops 23 at the bases of said prongs, this construction being shown most clearly in Figs. 2, 4, and 5, and, as illustrated clearly in the second named view, the arms 21 decrease in length toward the center of the hub 20 so that the prongs 22 will properly engage the beets. Although the stops 23 may be of any preferred construction, they are preferably in the form of spheres with their opposite sides flattened, each of said stops having formed therethrough an opening 24 through which the arms 21 pass, set screws 25 being provided for securing said stops upon said arms so that they may be adjusted to permit the prongs 22 to penetrate a greater or less amount.

The member 19 may be driven in any preferred manner, but a pair of sprocket chains 26 preferably pass around sprockets 27 on the shaft 18 and around other sprockets 29 on a transverse shaft 30 supported at its ends by the hangers 16. The shaft 30 is provided with spur gears 31 meshing with similar gears 32 on a transverse shaft 33 carried by the frame 6, said shaft 33 having sprockets 34 around which sprocket chains 35 pass, said chains being driven from sprockets 36 on the axle 1. By this drive, the pulling member 19 will be rotated in the opposite direction from the axle 1 and thus the prongs 22 which penetrate the beets B will serve to pull the latter from the earth, practically no resistance being offered on account of the fact that in removing the earth from the sides of the rows of beets, the plows 15 more or less loosen the remaining soil.

In case any of the beets should lodge on the prongs 22, they will be removed by a transverse horizontal finger 37 on the front end of an arm 38 which is secured at its rear end to the corresponding end of frame 6, said finger being located immediately above the path of the prongs as shown in Fig. 2.

In operation the machine is driven astride each row of beets and the operator rides upon a suitable seat S. The plows 15 now remove the earth from the sides of the row as shown clearly in Fig. 3 and leave the beets standing vertically although in a somewhat loosened condition. The prongs 22 of the rotating lifter 19 are now forced into the upper ends of said beets as said prongs move in the direction of the arrow in Fig. 2, and the beets are thus raised from the earth. Any beets which may be lodged upon the prongs 22 will be forced therefrom by the finger 37. The stops 23 prevent the prongs 22 from penetrating the beets an undesirable amount and said stops may be adjusted according to the size of the beets. For instance, if the crop is of large size it will be necessary for the prongs to penetrate a greater amount in order to pull them from the earth, whereas if the beets be small, it will not be required that said prongs enter so far. Adjustment of the stops 23 under the latter conditions, therefore, will prevent unnecessary mutilation of the product.

From the foregoing, taken in connection with the accompanying drawings, it will be obvious that although the machine is of comparatively simple and inexpensive nature, it will be highly efficient and durable. For these reasons the construction shown constitutes the preferred embodiment of the digger, but it is to be understood that within the scope of the invention as claimed, numerous changes may be made without sacrificing the principal advantages.

I claim:

1. A beet digger comprising means for removing the earth along each side of the beet row and leaving the beets standing in a narrow wall of earth, a rotary beet lifter mounted on an axis extending transversely of the machine for dislodging the beets from said wall, said lifter having a plurality of radiating prongs to penetrate the beets, and stops at the bases of said prongs for limiting the amount of penetration.

2. A structure as specified in claim 1, said stops being adjustable along said prongs for controlling the amount of penetration.

3. A beet digger comprising means for removing the earth along each side of the beet row and leaving the beets standing in a narrow wall of earth, a rotary beet lifter mounted on an axis extending transversely of the machine for dislodging the beets from said wall, said lifter comprising a hub, arms radiating therefrom and having prongs at their outer ends to penetrate the beets, and stops at the bases of said prongs to limit the amount of penetration.

4. A structure as specified in claim 3, said stops having openings through which the arms pass, and means for securing said stops in adjusted position on said arms.

5. A beet lifter comprising a hub, arms radiating therefrom and having prongs on their outer ends to penetrate the beets, and stops at the inner ends of said prongs for limiting the amount of penetration.

6. A structure as specified in claim 5, said stops having openings through which said arms pass, and means for securing said stops in adjusted position on said arms.

In testimony whereof I have hereunto set my hand in the presence of two subscribing witnesses.

WEAVER ALDUS RUSH.

Witnesses:
A. A. LAW,
L. E. NELSON.

Copies of this patent may be obtained for five cents each, by addressing the "Commissioner of Patents, Washington, D. C."